United States Patent Office 3,448,066
Patented June 3, 1969

3,448,066
AIR-DRYING UNSATURATED POLYESTER RESINS PREPARED FROM A POLYOL AND AN ADDUCT OF CYCLOPENTADIENE AND A DICARBOXYLIC ACID
Earl E. Parker, Allison Park, Pa., assignor to PPG Industries, Inc., Pittsburgh, Pa., a corporation of Pennsylvania
No Drawing. Filed Nov. 17, 1966, Ser. No. 595,012
Int. Cl. C08g *17/10, 17/12, 17/16*
U.S. Cl. 260—22                        12 Claims

ABSTRACT OF THE DISCLOSURE

A polyester resin having excellent air-drying characteristics is prepared by the reaction of a polyol with an adduct of cyclopentadiene and a dicarboxylic acid where the adduct consists of from about 1.3 parts to about 4 parts of cyclopentadiene to 1 part of the acid member based on mole proportions. The polyester resins are useful as can coatings.

---

This invention relates to novel and useful resinous compositions and, more particularly, to air-drying unsaturated polyester coating compositions prepared from a polyol and an adduct of cyclopentadiene and maleic anhydride.

Recently, adducts of cyclopentadiene and maleic anhydride have been employed in unsaturated polyester coating compositions additionally comprising an unsaturated polybasic acid, a polyol and an ethylenically unsaturated monomer such as styrene or diallyl phthalate. The monomer functions as a cross-linking agent by means of reaction with the unsaturated bonds of the acid. Maleic anhydride, in excess of that amount utilized in forming the adduct, is usually employed as the polybasic acid. The incorporation of the adduct itself serves to impart air-drying, or oxidative curing, characteristic to the polyester system, which is otherwise cured by the crosslinking action of the monomers.

Coatings prepared from the above compositions display excellent color, good resistance to acids and alkalies, and are employed as protective films on metal surfaces. But, although these polyester systems are satisfactory for certain purposes, the application of the coatings in many industrial areas has been limited because of less-than-satisfactory performance in two areas: curing rate and film flexibility.

The speed with which the air drying of such films occurs is of primary concern in industrial areas of application where the coated article is mass produced. For example, air-drying finishes are widely used in the can coating industry where the film serves as a lining for the container. Highly mechanized equipment is employed in producing such containers and the speed with which the final product can be made is, therefore, directly related to the length of time required for drying of the can lining. As a consequence, rapid-drying finishes are essential.

Flexibility is also an important property of air-drying finishes, especially in the area of can coatings, as described above. Here, the coating composition is usually applied by roll coating equipment to sheet metal, and cured, before the metal is formed into the cans. A widely-employed industrial process, for instance, consists of the stamping of can ends from flat, pre-coated metal sheets. The cured film must, therefore, be flexible enough to withstand such severe forming operations.

It has now been discovered that outstanding air-drying coating compositions, which dry entirely by means of oxidative curing, can be prepared from unsaturated polyesters comprising a polyol and an adduct of maleic anhydride and cyclopentadiene wherein the components of the adduct are present within a specific molar ratio of from 1.3 up to 4 parts of cyclopentadiene to 1 part of maleic anhydride. Surprisingly, whereas compositions employing cyclopentadiene in amounts outside this range have exhibited less-than-satisfactory air-drying properties, unsaturated polyesters prepared in accordance with these proportions not only display excellent air-drying characteristics but also can be made into highly flexible cured films.

Flexibility is readily imparted to the unsaturated polyester compositions of this invention by employing the adduct in combination with another acid, preferably a saturated aliphatic dibasic acid. Introduction of such compounds into the polymer framework does not significantly impair the superior air-drying properties of the system and, hence, the composition is especially valuable in the can coating industry, where both properties are of paramount importance.

The unexpected and advantageous properties of the polyesters of this invention relate primarily to the above-mentioned mole ratio of cyclopentadiene to maleic anhydride. This proportion is critical if the excellent air-drying properties of the film of the coating composition are to be obtained. The resulting polyester then consists essentially of a saturated polymer backbone with sufficient residual unsaturation to permit oxidative curing.

The significance of the mole fraction in terms of the polyester structure and reactivity is brought out by comparison with conventional air-drying polyester systems. As mentioned above, such compositions utilize, in addition to the acid and polyol components, an ethylenically unsaturated monomer as a cross-linking agent. It is an essential requirement of such compositions, therefore, that the resulting polyester contain unsaturated bonds, even after addition of the cyclopentadiene, which are capable of cross-linking with the monomer. Thus present air-drying polyester resins represent a combination of curing mechanisms and can be characterized as being only partially air-drying.

Moreover, when major amounts of cyclopentadiene have been employed in preparing the conventional resins, it has been found that they exhibit greatly decreased reactivity toward most conventional monomers and result in generally unacceptable air-drying systems. For these reasons, present air-drying polyester resins usually employ an excess of the acid component over the cyclopentadiene, and are often further modified by reaction with drying oils.

When polyesters are prepared according to the critical mole ratio disclosed, a completely air-drying composition, having drying characteristics superior to those of the present polyester compositions, is attained. These polyesters will not react with styrene or other vinyl monomers and need not be modified with any drying oils. The employment of cyclopentadiene, within this range, unexpectedly obviates the need for such components and modifications, and renders the compositions invaluable in preparing rapid air-drying finishes.

The resulting compositions are especially useful in preparing protective coatings or liners for the surfaces of tin plate and similar other metals, from which numerous containers, such as containers for edible material and similar articles may be fabricated. The compositions are not in any way limited to such application, however, since their outstanding properties render them generally useful as coatings on surfaces such as, for example, wood, plastic, steel or aluminum. Thus, in a specific but completely dissimilar application, they are highly valuable as coatings for metal baseboards, duct work and the like, where decorative properties, as well as those of durability, are desired.

The polyols used in the preparation of the unsaturated polyesters of this invention may be selected from a wide variety of such materials, including all of the conventionally used glycols, most of which are especially well-suited to the reaction herein disclosed. Among such glycols, the most useful include: propylene glycol, ethylene glycol, diethylene glycol, triethylene glycol, tetraethylene glycol, butylene glycol, tripropylene glycol, and the like. Other available polyols which may be employed are glycerol, trimethylolethane, trimethylolpropane, pentaerythritol, sorbitol, and the like. An especially preferred polyol is 2,2-dimethyl-1,3-propanediol, commonly known as neopentyl glycol.

The acid component of the unsaturated polyester of this invention comprises an adduct of cyclopentadiene and maleic anhydride consisting of about two parts of cyclopentadiene to one part of the other member, based on mole proportions. Preferably, the molar ratio between cyclopentadiene and maleic anhydride is between about 2-to-1 and 3-to-1, but ratios of from about 1.3 up to about 4-to-1 can also be employed. When the molar ratio falls below about 1.3-to-1, the system effectively loses its air-drying capabilities, while when amounts of the diene in excess of a 4-to-1 molar ratio are used, it is found that further formation of the adduct ceases.

The term "cyclopentadiene" is defined, for the purposes of this invention, to include lower homopolymers of the same, such as dicyclopentadiene or tricyclopentadiene, and substituted cyclopentadienes, such as methyl cyclopentadiene or other lower alkyl substituted cyclopentadienes. These compounds, when used in the invention, all appear to react similarly. Because of its availability and convenience, dicyclopentadiene is generally used. Similarly, maleic acid and its isomer fumaric acid, as well as citraconic acid and other structurally related, ethylenically unsaturated dicarboxylic acids, may also be utilized in combination with, or in place of, maleic anhydride.

As mentioned above, it is often preferable to employ polybasic acids in combination with the cyclopentadiene-maleic adduct in order to impart flexibility to the system. Included among such materials are a wide variety of saturated aliphatic dibasic acids having at least 4 carbon atoms. Especially preferred are dimer and trimer acids, which are high molecular weight dibasic acids, including, for example, those prepared by the polymerization of fatty acids such as oleic acid, linoleic acid, linolenic acid, and the like. Other suitable dibasic acids include succinic acid, adipic acid, azaleic acid, sebacic acid, glutaric acid, pimelic acid, and the like.

The dimer and trimer acids described above are usually commercially prepared and marketed as solutions comprising varying amounts of both acids. Traces of monobasic fatty acids are also usually present. For example, one commercial material (Empol 1018, produced by Emery Industries, Inc.) is described as a polymerized fatty acid having a trace of monobasic acid and consisting of 83 percent dimer acid and 17 percent trimer acid, and another useful material (Empol 1024), is characterized as a polymerized fatty acid having a trace of monobasic acid and consisting of 75 percent dimer acid and 25 percent trimer acid. Such mixtures also are completely suitable for use in this invention and, moreover, are often preferred.

Although the above-described acids are especially useful in imparting flexibility to the system, it is apparent from this function that numerous others may be employed, depending upon the degree of flexibility and other properties desired, as well as the particular application for which the composition is produced. It is only required that the acid be of a type that will not react with the diene utilized in forming the adduct. That is, the valuable air-drying properties obtained by this inventon are a direct result of the employment of the adduct components according to specific proportions, and any additional acids which would interfere with the formation and/or function of this adduct, are obviously not usable. Thus, even though saturated or long-chain dibasic and tribasic acids are preferred, any polybasic acid capable of modifying the polymer structure in the desired manner without reacting with the adduct or otherwise hindering its function are suitable.

Minor amounts of additional acids, including those conventionally used to modify air-drying resinous compositions, may also be employed, such as, for example, oleic acid, linoleic acid, trimellitic anhydride, etc. Here, also, the selected acid must be substantially non-participating, as described above, and, furthermore, should only be used in amounts of up to about 10 mole percent of the total acid component.

In producing the polyesters from the above components, the polyol portion is usually employed in a slight excess over the acid portion, the preferred range varying from about 0 to 10 mole percent of excess polyol. However, it is also possible to use up to a 10 mole percent mole excess of acid and as much as a 30 mole percent excess of polyol.

Among the above-described materials for use in preparing the polyester composition, an especially preferred combination comprises the utilization of neopentyl glycol, maleic anhydride, cyclopentadiene, and a dimer or trimer acid, or combination thereof, as described above. A particularly valuable composition containing these components comprises neopentyl glycol in amounts of from 90 to 130 mole percent of the total moles of the acid, and maleic anhydride in amounts of from 30 to 100 mole percent of the acid component, with the remaining 0 to 70 mole percent consisting of polymerized fatty acid, or mixtures thereof. As described above, cyclopentadiene is employed in preferred amounts of from a 2-to-1 up to a 3-to-1 molar ratio with the maleic anhydride.

The polyester resin of this invention is preferably prepared, according to conventional procedure, by first forming the unsaturated polyester and then adding the diene material, usually as dicyclopentadiene, to form the adduct. That is, maleic anhydride and polyol are introduced into a suitable reaction vessel, gradually heated to a reaction temperature of about 200° C., and maintained at that temperature until samples of the material, when drawn off, respond satisfactorily to a suitable viscosity test. Such test may comprise the Gardner-Holdt test which is conventional in the industry and, therefore, need not be described. The product, in most instances, will be reacted until a fairly high viscosity is obtained. The diene material is then added and refluxing continued until a desired viscosity is again reached. Heating is stopped and the product is cooled, thinned with an aromatic solvent and clarified by passing the solution through a filter press or a centrifuge.

Alternatively, it is also possible to first form the adduct and then carry out the esterification reaction. Here, the dicyclopentadiene and maleic anhydride components are admixed and heated until reaction is complete. The polyol component is then added, and the above esterification procedure followed until a suitable viscosity is obtained. Because of various side reactions which tend to occur when all components are admixed and refluxed together, however, it is usually not desirable to form the polyester in a single step operation.

The unsaturated polyester resin can be applied as a coating in any of a wide variety of conventionally-used solvents, such as, for example, xylene, toluene, or "Solvesso 150," which is a high-boiling, aromatic hydrocarbon solvent having a boiling point range of 187° C. to 203° C. Oxidative curing of the composition is rapidly accomplished by baking at a temperature of from about 400° F. to about 450° F. for about 8 to 10 minutes.

The coating composition can be applied to surfaces to be coated, such as blanks of sheet iron, steel, wood or plastic, by appropriate techniques such as spraying, roller coating, brushing, or the like. As previously indicated, a preferred metal substrate is tin plate, which is steel having thereon a coating of metallic tin, but the invention is not limited to the use of such metal. In some cases, for example, it may be desirable to apply the lining material to black metal or to metal which has been primed with various primers or which has been anodized or otherwise treated.

The resin of this invention is also often employed in combination with a wide variety of conventional resins, including both natural and synthetic resins such as vinyl resins, alkyd resins, epoxy resins, phenolic resins, oleoresinous varnishes, and the like. For example, excellent coating systems can be prepared by blending the air-drying polyester resins, herein disclosed, with compositions such as the cyclopentadiene-modified drying oils disclosed in the following patents: U.S. Patent No. 2,689,231, U.S. Patent No. 2,390,530, U.S. Patent No. 2,397,600, U.S. Patent No. 2,398,889.

When used with such other resins, or when used alone, additional materials conventionally employed in coating compositions, such as driers, pigments or dyes, and the like, are usually included. But, such materials are not required in the utilization of the resin herein disclosed. Driers, for instance, are generally of little or no value in increasing the already rapid air drying of this system, and they are thus used only to the extent that other resins, used in combination, may require them.

The following examples illustrate in detail methods of practicing the instant invention. The examples are not intended to limit the invention, however, for there are, of course, numerous possible modifications and variations.

EXAMPLE 1

In preparing an unsaturated polyester of this invention, a reaction vessel was charged with the following:

| | Moles |
|---|---|
| Maleic anhydride | 3.0 |
| Polybasic acid [1] | 1.0 |
| Neopentyl glycol | 4.2 |

[1] Polymerized fatty acid mixture having an acid number of from 188 to 196, a color 8 (Gardner) and a viscosity (G-H) of Z-4.

This mixture was gradually heated to a temperature of about 210° C. and maintained at this temperature for 6 hours, at which point the esterification reaction was substantially completed, as indicated by a G viscosity rating based on the Gardner-Holdt (G-H) Scale, the test having been run on a sample of the mixture as a 60 percent solution in ethylene glycol monoethyl ether. Next, 3.3 moles of dicyclopentadiene were added to the mixture which was then maintained at a temperature of about 190° C. with stirring, until a viscosity of S was reached, as above. The resin was then thinned to about 50 to 55 percent solids with "Solvesso" 150, a high-boiling, aromatic hydrocarbon solvent with a boiling point of 187° C. to 203° C., and filtered using a Sparkler filter press. The final product had an acid value of 6, a percent solids of 73.2, a color of 4+ (Gardner), and a viscosity of Z-4 to Z-5 (G-H).

EXAMPLE 2

An unsaturated polyester resin of this invention was prepared according to the procedure of Example 1, employing the following components:

| | Moles |
|---|---|
| Maleic anhydride | 2.5 |
| Polybasic acid (as above) | 1.0 |
| Neopentyl glycol | 3.675 |
| Dicyclopentadiene | 2.78 |

The resulting product had an acid value of 3, percent solids of 66.2, viscosity of X (G-H), and a color of 4+ (Gardner).

EXAMPLE 3

In preparing an unsaturated polyester resin in accordance with the procedure of Example 1, the following materials were employed:

| | Moles |
|---|---|
| Maleic anhydride | 3.5 |
| Neopentyl glycol | 4.85 |
| Polybasic acid [1] | 1.0 |
| Dicyclopentadiene | 3.85 |

[1] Mixture of polymerized fatty acids having a trace of monobasic acid and consisting of 75 percent dimerized acid and 25 percent trimerized acid. It has an acid number of 189 to 197, specific gravity at 15.5° C. of 0.947, and a viscosity of Z-5 (G-H).

The resultant product had an acid value of 13, a percent solids of 57.4, a color of 6+ (Gardner), and a viscosity of O to P (G-H).

The compositions of Examples 1–3 were applied as coatings upon tin plate metal, of a grade corresponding to that employed in the fabrication of conventional tin cans, and were baked for 8 to 10 minutes at an oven temperature of from 400 to 450° F. Panels were cut from the coated sheets and subjected to various standard industrial tests, including:

(1) Immersion in boiling water for 60 minutes,
(2) Immersion in water under pressure and at a temperature of 250° F. for 90 minutes, and
(3) A fabrication test in which the coated panels are fabricated into tin can lids and immersed in an acidic copper sulfate solution for 2 minutes.

In the fabrication test, penetration of the solution, with resultant deposition of copper on the substrate, is an indication of failure of the films in the fabricating operation.

After completion of the above tests, the panels were carefully examined in order to detect any coating failure. It was found that the panels were completely free from visually observable impairment and, in addition to displaying outstanding fabrication characteristics, exhibited excellent adhesion and hardness.

EXAMPLE 4

In preparing an unsaturated polyester of this invention according to an alternative process, 5 moles of maleic anhydride were charged to a reaction vessel and heated to about 150° C. Five moles of dicyclopentadiene were then added dropwise and the mixture was heated to 190° C. and maintained at this temperature for 7 hours, at which point the reaction was substantially complete. Next, 5.25 moles of neopentyl glycol were added and the mixture was heated at 200° C. for about 6 hours, after which period a viscosity of Z-5+ was reached. The resin was thinned with "Solvesso" 150 (as in Example 1), and the resulting product had an acid value of 22, a percent solids of 52.3, a viscosity of C to D (G-H), and a color of 11+.

EXAMPLES 5–11

Three air-drying polyester resins of this invention, Resins A, B and C, were prepared, according to Example 1, in the following mole proportions:

| Components | Resin A | Resin B | Resin C |
|---|---|---|---|
| Maleic acid | 3.5 | 4.0 | 5.0 |
| Empol 1018 (as in Example 1) | 1.0 | 1.0 | 1.0 |
| Neopentyl glycol | 4.73 | 5.25 | 6.3 |
| Dicyclopentadiene | 3.85 | 4.4 | 5.5 |

The resulting resins were characterized by the following properties:

| | Resin A | Resin B | Resin C |
|---|---|---|---|
| Acid number | 10 | 18 | 12 |
| Viscosity (G-H) | X-Y | N | U |
| Color (Gardner) | 4+ | 4+ | 4+ |
| Percent solids | 60.7 | 57.2 | 66.7 |

Each of the above resins was then blended with a mixture of three resins, designated D, E, and F, of the following compositions:

Resin D: Parts by weight
- Linseed oil _____ 300
- Dicyclopentadiene _____ 249
- Naphtha (solvent) _____ 272

Resin E: Parts by weight
- Phenolic resin[1] _____ 151.0
- Wood oil _____ 59.1
- Linseed oil _____ 176.5
- Naphtha (solvent) _____ 388.0

[1] Non-heat-hardening, phenol-formaldehyde resin, having a specific gravity of 1.08 and a softening range of 215–245° F.

Resin F: Parts by weight
- Ester gum _____ 250
- Rosin _____ 150
- Manganese acetate _____ 28
- Solvent[1] _____ 60

[1] A high-boiling point aromatic naphtha, having a specific gravity of 0.873 at 60° F., and a boiling point range of 322° F. to 329° F.

Resins D, E and F were mixed in the following weight proportions:

Parts by weight
- Resin D _____ 660.0
- Resin E _____ 94.0
- Resin F _____ 3.4

To this mixture was added 0.15 part by weight of iron linoresinate drier and 25 parts by weight of naphtha solvent. Seven coatings were made by blending the above mixture with the three resins of this invention, along with 15 percent by weight (based on the total composition) of zinc oxide pigment. Table I shows the weight proportions of each coating composition:

TABLE I

| Example | Parts by weight | | | |
|---|---|---|---|---|
| | Resin A | Resin B | Resin C | Mixture (Resins D, E and F) |
| 5 | 60 | | | 40 |
| 6 | 50 | | | 50 |
| 7 | | 70 | | 30 |
| 8 | | 60 | | 40 |
| 9 | | 50 | | 50 |
| 10 | | | 60 | 40 |
| 11 | | | 50 | 50 |

A coating of each of the above compositions was drawn onto standard tin plate panels, in a film weight of 5 mgm. per square inch, and baked at 400° F. for ten minutes. "202" can ends and 28 millimeter caps and shells were then punched from the above-coated panels in order to determine the fabrication properties of the coating. "202" can ends are identical to the bottoms of conventional tin cans and are so designated since they have a diameter of 2 2/16 inches. The caps are continuous thread, knurled screw caps as used industrially and the shells are identical in size except that they have not been further machined; i.e., they are not threaded or knurled. Similar pieces, designated as the control, were formed from panels coated with the mixture of Resins D, E and F, as described above, but without the polyester. Scores of from 0 (excellent) to 10 (poor) were determined by visual observation. The results, in Table II, disclose that the compositions of this invention exhibit outstanding fabrication abilities in all three tests and are superior in both the shell and cap fabrications.

TABLE II.—FABRICATION TEST
0 = Excellent

| Coating composition | 28 mm. shells | 28 mm. caps | "202" can ends |
|---|---|---|---|
| Example 5 | 0–1 | 3–4 | 0 |
| Example 6 | 1 | 4 | 0 |
| Example 7 | 0–1 | 3–4 | 0 |
| Example 8 | 0–1 | 3 | 0 |
| Example 9 | 0–1 | 2 | 0 |
| Example 10 | 0–1 | 2–3 | 0 |
| Example 11 | 1 | 3 | 0 |
| Control (mixture of Resins D, E and F) | 2–3 | 5 | 0 |

Results similar to those indicated by the above examples are attainable utilizing different molar ratios of cyclopentadiene to maleic anhydride, providing that the molar ratio is always within the disclosed range, or any of the enumerated polybasic acids and combinations thereof. Also, good properties are realized where the resins of this invention are used in combination with various other compositions, such as phenolic resins, epoxy resins, oleoresinous materials and the like, as those described above.

Although specific examples of the instant invention have been set forth hereinabove, it is not intended that the invention be limited solely thereto, but to include all of the variations falling within the scope of the appended claims.

I claim:
1. An air-drying unsaturated polyester comprising (1) a polyol and (2) an adduct of cyclopentadiene and an acid member selected from the group consisting of maleic anhydride, maleic acid, fumaric acid, and citraconic acid, the adduct consisting of at least 1.3 parts and up to about 4 parts of cyclopentadiene to 1 part of the acid member, based on mole proportions.
2. The composition of claim 1 wherein the adduct consists of from about two parts up to about 3 parts of cyclopentadiene to 1 part of the acid member, based on mole proportions.
3. The composition of claim 1 additionally comprising a polybasic acid.
4. The composition of claim 3 wherein the additional acid is a saturated aliphatic dibasic acid having at least 4 carbon atoms.
5. The composition of claim 3 wherein the additional acid is a dimerized fatty acid, a trimerized fatty acid, or a mixture thereof.
6. The composition of claim 1 wherein the acid member is maleic anhydride.
7. The composition of claim 1 wherein the polyol is 2,2-dimethyl-1,3-propanediol.
8. The composition of claim 1 comprising 2,2-dimethyl-1,3-propanediol, maleic anhydride, cyclopentadiene, and a combination of a dimerized fatty acid and a trimerized fatty acid.
9. The composition of claim 8 comprising 2,2-dimethyl-1,3-propanediol in amounts of from 90 to 130 mole percent of the total moles of acid, and maleic anhydride in amounts of from 30 to 100 mole percent of the acid component, with the remaining 0 to 70 mole percent consisting of a combination of dimerized and trimerized fatty acids.
10. A coating composition comprising a combination of the composition of claim 1 and one or more resins selected from the group consisting of phenolic resins, drying oil resins, vinyl resins, epoxy resins and alkyd resins.
11. An article comprising a metal surface having thereon an adherent layer of the polyester composition of claim 1.

12. An article comprising a metal surface having thereon an adherent layer of the polyester of claim 3.

References Cited

UNITED STATES PATENTS

| | | | |
|---|---|---|---|
| 2,385,776 | 10/1945 | Daniels et al. | 260—22 |
| 2,387,895 | 10/1945 | Gerhart | 260—23.7 |
| 2,397,240 | 3/1946 | Butler | 260—22 |
| 2,404,836 | 7/1946 | Gerhart et al. | 260—22 |
| 2,452,992 | 11/1948 | Butler | 260—22 |
| 2,671,070 | 3/1954 | Knapp | 260—23.7 |
| 3,124,550 | 3/1964 | Salgado et al. | 260—22 |
| 3,347,806 | 10/1967 | Zimmermann | 260—22 |

DONALD E. CZAJA, *Primary Examiner.*

R. W. GRIFFIN, *Assistant Examiner.*

U.S. Cl. X.R.

99—181; 117—132, 134, 161, 167; 260—20, 23.5, 23.7, 26, 33.6, 75, 835, 842, 873